United States Patent
Viswanathan

(10) Patent No.: US 6,916,900 B1
(45) Date of Patent: Jul. 12, 2005

(54) CATALYTIC EFFECTS OF TRANSITION METAL IONS IN THE SYNTHESIS OF POLYANILINE GRAFTED LIGNOSULFONIC ACID

(75) Inventor: Tito Viswanathan, Little Rock, AR (US)

(73) Assignee: GeoTech Chemical Company, LLC, Tallmidge, OH (US)

(*) Notice: Subject to any disclaimer, the term of this patent is extended or adjusted under 35 U.S.C. 154(b) by 0 days.

(21) Appl. No.: 10/818,114

(22) Filed: Apr. 5, 2004

Related U.S. Application Data

(60) Provisional application No. 60/460,027, filed on Apr. 3, 2003.

(51) Int. Cl.[7] .................... C08G 65/40; C08G 73/00
(52) U.S. Cl. .................. 528/210; 525/54.1; 528/214; 528/422
(58) Field of Search ................ 525/54.1; 528/210, 528/214

(56) References Cited

U.S. PATENT DOCUMENTS

| | | |
|---|---|---|
| 3,546,155 A | 12/1970 | Chandler |
| 3,748,172 A | 7/1973 | Speirs et al. |
| 3,862,851 A | 1/1975 | Speirs et al. |
| 4,009,131 A | 2/1977 | Farone |
| 4,048,136 A | 9/1977 | Kobayashi et al. |
| 4,086,153 A | 4/1978 | Ariga et al. |
| 4,130,469 A | 12/1978 | McGinnies |
| 4,140,816 A | 2/1979 | McGinnies |
| 4,163,810 A | 8/1979 | McGinnies |
| 4,518,726 A | 5/1985 | Kato et al. |
| 5,069,820 A | 12/1991 | Jen et al. |
| 5,160,457 A | 11/1992 | Elsenbaumer |
| 5,217,649 A | 6/1993 | Kulkarni et al. |
| 5,274,021 A | 12/1993 | Geeck et al. |
| 5,281,363 A | 1/1994 | Shacklette et al. |
| 5,290,483 A | 3/1994 | Kulkarni et al. |
| 5,456,862 A | 10/1995 | Kwan-Yen et al. |
| 5,532,025 A | 7/1996 | Kinlen et al. |
| 5,567,355 A | 10/1996 | Wessling et al. |
| 5,645,890 A | 7/1997 | MacDiarmid et al. |
| 5,648,416 A | 7/1997 | Miller et al. |
| 5,658,649 A | 8/1997 | Wrobleski et al. |
| 5,853,462 A | 12/1998 | Spellane et al. |
| 5,853,621 A | 12/1998 | Miller et al. |
| 5,871,671 A | 2/1999 | Kinlen et al. |
| 5,968,417 A | 10/1999 | Viswanathan |
| 5,976,419 A | 11/1999 | Hawkins et al. |
| 6,059,999 A | 5/2000 | Viswanathan |
| 6,231,789 B1 | 5/2001 | Hawkins et al. |
| 6,299,800 B1 | 10/2001 | Viswanathan |
| 6,440,332 B1 | 8/2002 | Geer et al. |
| 6,627,117 B2 | 9/2003 | Geer et al. |
| 6,764,617 B1 * | 7/2004 | Viswanathan et al. ...... 252/500 |
| 2002/0195592 A1 | 12/2002 | Geer et al. |

FOREIGN PATENT DOCUMENTS

| | | |
|---|---|---|
| DE | 28 54 696 | 7/1980 |
| GB | 1494212 | 12/1974 |
| JP | 59075943 | 4/1984 |
| JP | 7103185 | 4/1995 |
| JP | 08277370 | 10/1996 |
| WO | WO-99/64524 | 12/1999 |

\* cited by examiner

*Primary Examiner*—James J. Seidleck
*Assistant Examiner*—Irina S. Zemel
(74) *Attorney, Agent, or Firm*—Brause McDowell; Daniel A. Thomson; John M. Skeriotis

(57) ABSTRACT

A method of making polyaniline grafted lignosulfonic acid is disclosed. The method comprises mixing of aniline and a lignosulfonate in the presence of a transition metal salt.

7 Claims, 3 Drawing Sheets

Molar Ratio of Silver Nitrate to Persulfate

CATALYTIC EFFECTS OF TRANSITION METAL IONS IN THE SYNTHESIS OF POLYANILINE GRAFTED LIGNOSULFONIC ACID

CLAIM OF PRIORITY

This application claims priority from U.S. Provisional Patent Application Ser. No. 60/460,027 and filed on Apr. 3, 2003, which is incorporated by reference herein.

FIELD OF THE INVENTION

This invention relates to use of transition metal ions to catalyze lignosulfonic acid having polyaniline grafted thereto ("Ligno-PANi").

BACKGROUND OF THE INVENTION

The synthesis of inherently conducting polymers (ICPs) has become an appealing area of research since the discovery of electrically conducting conjugated polymers.

Polyaniline (PANi) is an ICP that has been widely explored because it is relatively cheap and easy to synthesize. The applications of polyaniline (PANi) are of great interest to many fields. A disadvantage in the use of polyaniline is the insolubility of the emeraldine salt in water as well as most organic solvents.

Polyaniline grafted lignosulfonic acid (Ligno-PANi) is a water-dispersible inherently conductive polymer, such as disclosed in U.S. Pat. Nos. 5,968,417; 6,059,999; and 6,299,800, the disclosures of which are incorporated by reference herein.

Ligno-PANi is one of the only dispersible polyanilines commercially available on a mass scale, presently commercially available from PolyOne Corporation from Avon Lake, Ohio (www.polyone.com). The high solubility of the lignosulfonate counter ion leads to a dispersible product.

Because lignin is the second most abundant renewable resource in nature and the fact that lignosulfonates are a waste product of the paper industry, the synthesis of Ligno-PANi is environmentally friendly.

It is known that the incorporation of dopants to achieve higher conductivities in addition to lignosulfonates during the polymerization process results in prohibitively long initiation times.

SUMMARY OF THE INVENTION

It has been found that transition metal ions including silver and ferrous ions are potential catalysts for the reaction. Silver nitrate is preferred as a catalyst, followed closely by ferrous sulfate heptahydrate, among the various candidates as transition metal catalysts.

One aspect of the present invention is a method of making polyaniline grafted lignosulfonic acid, comprising the mixing of aniline and a lignosulfonate in the presence of a transition metal salt.

The Ligno-PANi derivatives produced by the catalyzed reaction of the present invention demonstrated no negative effects in conductivity (15–23 S/cm) or dispersibility. In addition, residual metal analysis indicated that while not much iron remained (<0.01%) in the product, a large amount of silver was present (1.8%) in the final product. The incorporation of the lignosulfonate macromolecule provides dispersibility in a wide range of solvents and resins without significantly decreasing the conductivity (3–4 S/cm).

In addition to the inherent conductivity within aniline grafted lignosulfonic acid, processibility as well as other properties such as conductivity can be improved by the optional use of an additional dopant [e.g., methanesulfonic acid (HMSA) and p-toluenesulfonic acid (pTSA)] to match the characteristics of the solvent. A problem with these synthetic procedures is that initiation time when in situ with lignosulfonates is prohibitively long, on the order of hours as opposed to minutes as with HCl-PANi.

Therefore, another optional feature of the present invention is the effect of transition metal ions on both the synthesis of Ligno-PANi with methanesulfonic acid (HMSA) as an additional dopant (MSA-LP) as well as on the synthesis of MSA-PANi.

Other features, options, and advantages are described in greater detail below.

EMBODIMENTS OF THE INVENTION

EXAMPLES

Example 1

Synthesis of Ligno-PANi

Ligno-PANi (LP) was synthesized by dissolving 0.25 g of sodium lignosulfonate (Aldrich); Reax 825E from Westvaco, in 25 mL of methanesulfonic acid solution.

One milliliter of distilled aniline was then added to the reaction mixture. The reaction was cooled to 0 θC. Once cooled, 0. 187 g of $AgNO_3$ (Aldrich) in about 2 ml water was added followed by 2.62 g of sodium persulfate (Aldrich). The reaction was allowed to react overnight and was vacuum filtered through a Whatman #4 filter paper. The wet cake was washed with water until the filtrate was clear. Two successive washings of the cake with 1M HMSA were performed. The cake was dried under vacuum. The filtrate containing excess $AgNO_3$ was combined with NaCl to form the non-hazardous AgCl and was disposed of properly.

Electrochemical Measurements. A two electrode system was employed for the measurements. A glassy carbon electrode was used as the working electrode and a SSCE was used as the reference electrode. In order to ensure that the polymerization products did not affect the porosity of the frit, the SSCE was placed in a separate vessel containing a saturated KCl solution and connected to the system via Luggin capillary capped with a semi-permeable membrane.

The electrodes were connected to an EG&G PAR 283 potentiostat. The software used to collect the data was an open circuit potential monitoring program within the corrosion SoftCORR corrosion measurement software. Potential measurements were collected at 30 second intervals for 24 hours.

Conductivity Measurements. Conductivity values were obtained for pressed pellets using an Alessi four-point conductivity probe.

Electrochemical Results. The use of silver nitrate as a catalyst in the preparation of Ligno-PANi produced significant results. The initiation time required for polymerization was slightly less for MSA-PANi and was dramatically less for MSA-LP. During the reaction a color change is observed from a brown to green color allowing for an indicator of approximate initiation times.

Figure 1:
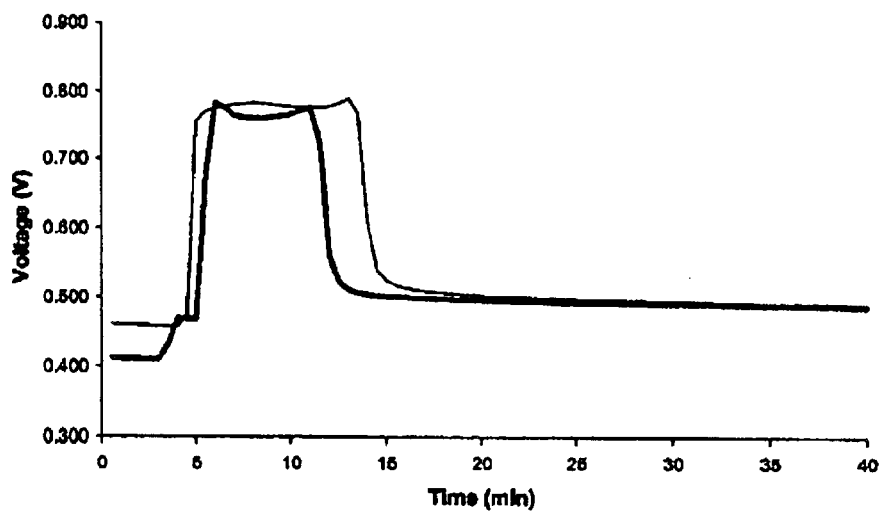
FIG. 1 is a graph of the potential profile of MSA-PANi with and without the aid of $AgNO_3$ comparing Voltage over Time, where the bold line is with $AgNO_3$.
Figure 2:
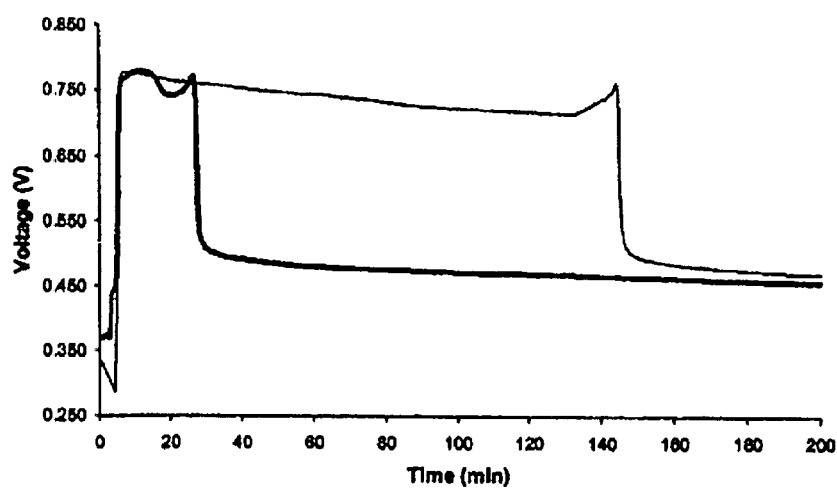
FIG. 2 is a graph of the potential profile of MSA-Ligno-PANi with and without the aid of $AgNO_3$ comparing Voltage over Time, where the bold line is with $AgNO_3$.

By utilizing electrochemical methods one can recognize the effect silver nitrate has on the reaction. The potential profiles for this study can be seen in FIGS. 1 and 2. The first rise in potential is the induction period, when the sodium persulfate dissociates into sulfate radicals. Upon formation of these radicals, polymerization can begin.

The first peak is accompanied by a color change in the reaction indicating that polymerization has been initiated. During this plateau period the persulfate continues to dissociate and oxidize the aniline to polyaniline tetramers and oligomers. This process continues until all the persulfate is used up and the oligomeric polyaniline is in its highest oxidized form: pernigraniline. The sharp peak at the end of the plateau period indicates that the oligomers present in the pemigraniline form begin to oxidize the remaining monomer and in return are reduced to the emeraldine state at which time the bulk solution undergoes polymerization.

When lignin is present in the reaction, the time required for the bulk solution to begin polymerization is prohibitively long. This may be due in part to the larger size of the dopant/template involved in the reaction. It is also known, however, that lignin is a radical scavenger.

This could result in a lower effective concentration of persulfate and therefore a longer reaction time.

With the addition of silver ions, however, the point at which the pernigraniline stage is reached is much faster. The silver nitrate is thought to aid in two aspects of the polymerization of aniline to pernigraniline. One of the advantages is the quicker formation of sulfate radicals. Another theory to consider is that once these sulfate radicals are formed, the silver is now in its 2+ oxidation state and the complexation with ortho-catechols of lignin is possible. These complexes have been shown to possess oxidative capabilities in the decarboxylation of acids, and may also result in the faster formation of pernigraniline.

Conductivity Results. The addition of silver nitrate to the process did more than just decrease reaction time. High conductivity values were obtained for the products also. A maximum value of 30 S/cm was obtained for MSA-LP with $AgNO_3$. Though such a high value was obtained for one sample an average value of about 16 S/cm can be expected. The inconsistencies in the conductivity values are still being explored.

Precious Metal Recovery. At the end of many of the reactions studied, the formation of metallic silver within the reaction vessel was observed. The ortho-catechols and ortho-quinone functionalities of the compounds serve as sites for which metals can be obtained from metal sulfate, nitrate, oxide, etc containing compounds. The redox capability of the polyaniline chain could thus aid in the recovery of metals.

The use of silver ions in the synthesis of Ligno-PANi decreases reaction times. Through the research thus far, there have been no appreciable drawbacks to the incorporation of $AgNO_3$ into the polymerization. The electrochemistry of this reaction has shown the dramatic effects of silver ions as a catalyst in the polymerization. There are many advantages for industry looking to produce a highly conductive polymers with short initiation times.

Example 2

Synthesis of Ligno-PANi

Ligno-PANi with methanesulfonic acid as an additional dopant (MSA-LP) was synthesized by dissolving 0.25 g of sodium lignosulfonate (Reax 825E from Westvaco) in 25 mL of 1M HMSA. One milliliter (0.011 moles) of distilled aniline was then added to the reaction mixture. The reaction was cooled to ~0° C. Then, 0.0011 moles of the different metal salts dissolved in water was added followed by 2.62 g (0.011 moles) of sodium persulfate (Aldrich). The reaction was carried out overnight and then vacuum filtered through a Whatman #4 filter paper. The wet cake was washed with water until the filtrate was clear. Two successive washings of the cake with 1M HMSA were performed. The cake was dried under vacuum.

Electrochemical Measurements A two electrode system was employed for the electrochemical measurements. A glassy carbon electrode was used as the working electrode and a silver-silver chloride electrode (SSCE) was used as the reference. In order to ensure that the polymerization products did not affect the porosity of the frit, the SSCE was placed in a separate vessel containing a saturated KCl solution and connected to the system via a Luggin capillary capped with a semi-permeable membrane. The electrodes were connected to an EG&G PAR 283 potentiostat. The software used to collect the data was an open circuit monitoring program within the SoftRCORR corrosion measurement software. Potential measurements were collected at 30-second intervals starting 5 minutes before the addition of persulfate. The reactions were monitored for a total of 24 hrs.

Conductivity Measurements Conductivity values were obtained for pressed pellets (1.3 cm diameter, <1 mm thick) using an Alessi four-point conductivity probe connected to a Keithley electrometer and a Keithley programmable current source.

Analysis of residual metals The dry samples catalyzed with silver nitrate and ferrous sulfate heptahydrate were digested using $HCl/HNO_3$ in a CEM microwave digestion system. The metal content was analyzed using a Perkin-Elmer Optima 4310 DV ICP-0ES.

Results and Discussion While it might be assumed that transition metals with similar redox potentials should show similar catalytic effects, the results indicate otherwise. Table 1 lists the time required for the color to change to a deep green indicative of the formation of the emeraldine salt for several different transition metal salts. All reactions shown in Table 1 contain lignosulfonates and HMSA.

TABLE 1

Comparison of times required for color change during the polymerization of MSA-LP for various transition metal salt catalysts.

| Transition Metal Salt | Time Required for a Color Change (min) |
|---|---|
| $FeCl_2 \cdot 4H_2O$ | 300 |
| $Fe(NO_3)_3 \cdot 6H_2O$ | 300 |
| $CuSO_4 \cdot 5H_2O$ | 245 |
| $Ce(NO_3)_3 \cdot 6H_2O$ | 225 |
| $Co(NO_3)_2 \cdot 6H_2O$ | 225 |

TABLE 1-continued

Comparison of times required for color change during the polymerization of MSA-LP for various transition metal salt catalysts.

| Transition Metal Salt | Time Required for a Color Change (min) |
|---|---|
| CuNO$_3$.2.5H$_2$O | 210 |
| CuBr | 135 |
| No catalyst | 130 |
| FeCl$_3$.6H$_2$O | 30 |
| FeSO$_4$.7H$_2$O | 15 |
| AgNO$_3$ | 10 |

It is apparent that silver nitrate and ferrous sulfate heptahydrate reduced the time required for an observable color change dramatically. The solubilities of the salts, although varied, should not play a significant role since only catalytic amounts were being added.

Figure 3:
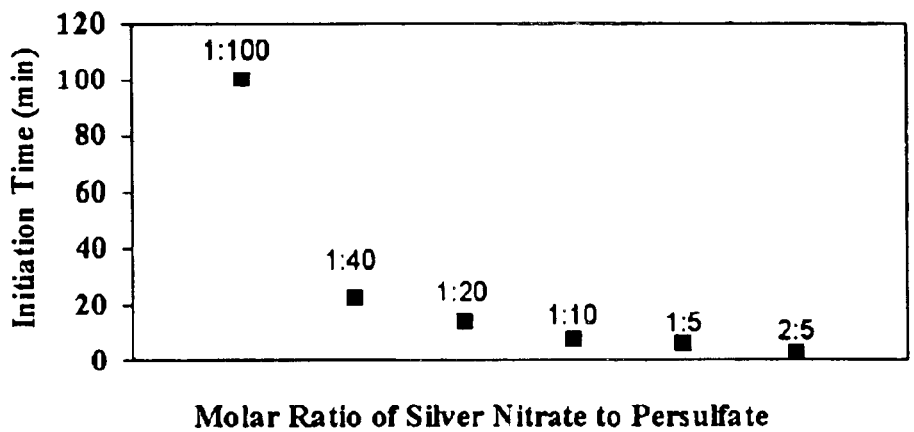
FIG. 3 is a graph of Initiation times for MSA-LP as a function of molar ratio silver nitrate to sodium persulfate.

Initially all catalysts were added in a 1:10 molar ratio of catalyst to persulfate based on the previously mentioned catalytic studies of silver. Other molar ratios of silver nitrate to persulfate were also studied to identify the optimum ratio for the catalysis of the synthesis of MSA-LP. FIG. 3 is a graph of the initiation time for the reaction as a function of molar ratio of silver nitrate to persulfate. The results indicate that a 1:10 ratio is optimal since no significant decrease in initiation time is seen at higher ratios. This molar ratio was used to study both the silver nitrate and the ferrous sulfate heptahydrate by monitoring the reaction potential as a function of reaction time.

Electrochemical Results The effects of silver nitrate and ferrous sulfate heptahydrate on the MSA-LP reaction were compared with their effects on the MSA-PANi reaction via potential profile monitoring. Both silver nitrate and ferrous sulfate heptahydrate exhibited significant catalytic effects in the preparation of Ligno-PANi. While an approximation of initiation time can be visually obtained, the exact time of bulk polymerization can be clearly seen in the potential profile. Previous studies of the electrochemical reaction of aniline polymerization have offered help in the dissection of the potential profiles. The potential profiles for this study can be seen in FIGS. 4 and 5.

The first rise in potential can be labeled as the induction period. The sodium persulfate dissociates to form sulfate radicals. Since the formation of the anilinium radical is the rate limiting step, the concentration of sulfate radicals continues to rise resulting in increasing potential. The induction period is followed by a period previously labeled as the plateau period. This is misleading since the potential during this time actually decreases. This decrease can be attributed to the formation of anilinium radicals and the subsequent formation of oligomers. The slight decrease during the plateau period is followed by a sharp increase indicative of the formation of oligomeric pemigraniline. The pemigraniline oligomers then begin to oxidize the remaining aniline monomers and possibly oligomers resulting in a sharp decrease in potential indicative of bulk polymerization. The resulting polymer is in the emeraldine oxidation state.

When lignosulfonates are used as the dopant/template the time required for the bulk solution to begin polymerization is longer than traditional reactions such as the synthesis of HCl-PANi. While not prohibitively long, the increased initiation time may be due to attraction of the anilinium salt for the polyaromatic lignosulfonate macromolecule; this interaction results in greater steric hindrance. This may reduce the ability of the anilinium radicals to form. In addition it is also known that lignosulfonates are radical scavengers. This could result in a lower effective concentration of persulfate and therefore decrease the concentration of anilinium radical cations.

When certain second dopants are used in situ with lignosulfonates, the time required for initiation of bulk polymerization is prohibitively long. In addition to the steric hindrance of the lignosulfonate previously discussed, the sulfonic acid groups of second dopants also increase steric hindrance. The greater inhibition for the abstraction of the hydrogen atom from the anilinium salt due to steric factors probably results in prolonging the bulk polymerization. This has been observed in the use of HMSA as well as pTSA. Further studies may indicate that as the functionality of the sulfonic acid is varied, the initiation time may be prolonged.

With the addition of silver nitrate or ferrous sulfate heptahydrate, the time required for bulk polymerization to begin is much less. This causes the plateau period to be shortened significantly. As the sulfate radicals form, the metal cations are likely to form complexes which are instrumental in the formation of anilinium radicals. The metal-anilinium complex is less sterically hindered than the anilinium methanesulfonate salt allowing for the easier abstraction of hydrogen atoms.

Figure 4:
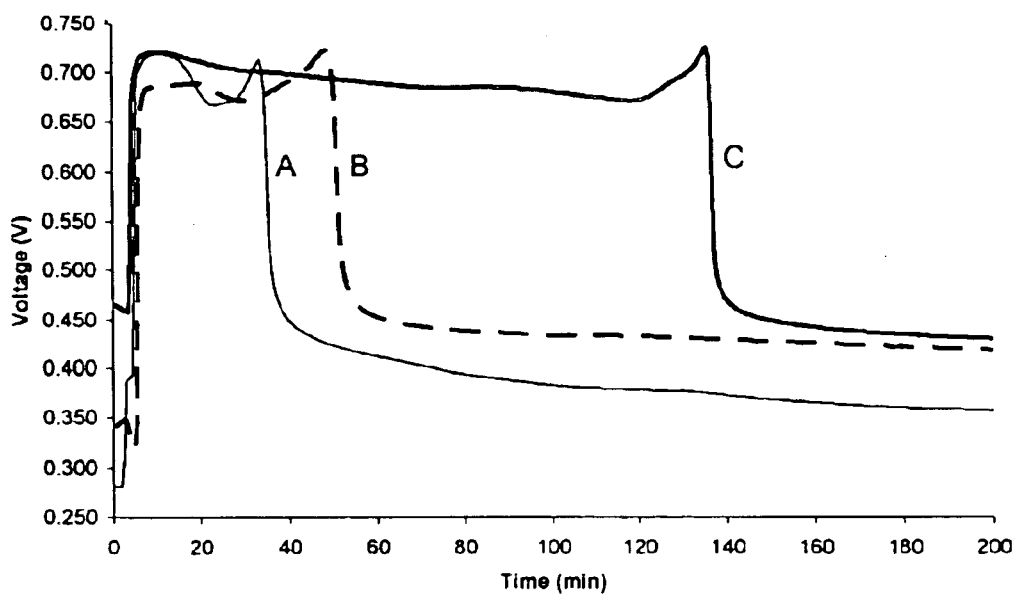
FIG. 4 is a graph of the potential profile of A) silver nitrate catalyzed MSA-LP, B) ferrous sulfate heptahydrate catalyzed MSA-LP, and C) MSA-LP (no catalyst).
Figure 5:
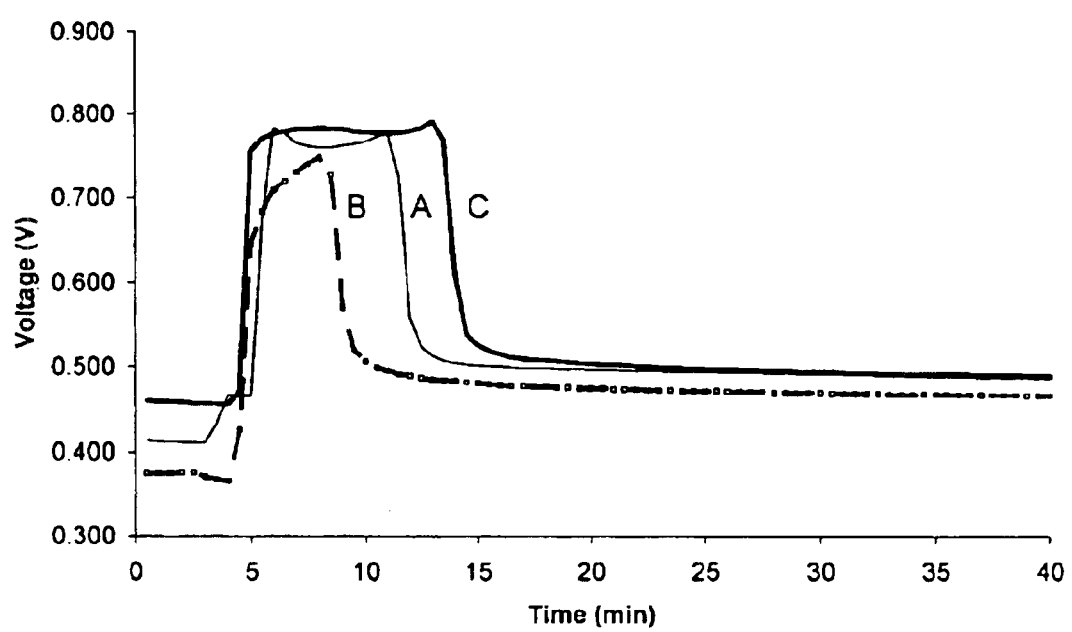
FIG. 5 is a graph of the potential profile of A) silver nitrate catalyzed MSA-PANi, B) ferrous sulfate heptahydrate catalyzed MSA-PANi, and C) MSA-PANi (no catalyst).

As seen in the MSA-PANi reactions (FIG. 5), ferrous sulfate heptahydrate is more effective in decreasing the time for bulk polymerization than silver nitrate. The difference in catalytic effects also can be attributed to steric effects since the atomic radius of the iron ion is smaller than the silver ion. Although this is true, the ferrous sulfate heptahydrate did not exhibit better catalytic effects than silver nitrate in the synthesis of MSA-LP (FIG. 4).

Lignosulfonates have been shown to easily form complexes with iron species. This would result in a lower concentration of free catalyst affecting the time required to reach bulk polymerization.

Elemental Metal Formation At the end of the reactions catalyzed by silver nitrate, the formation of metallic silver within the reaction vessel was observed. Lignosulfonates contain some ortho-catechol moieties that are known to complex metal species readily and aid in the recovery of metals from metal sulfate, nitrate, oxide, etc containing compounds. The redox capability of the polyaniline chain also aids in the recovery of precious metals. Future studies will focus on the effectiveness of lignosulfonate doped ICPs for precious metal recovery.

XRD Analysis In order to determine the nature of the Ag species observed at the end of the reactions, X-ray diffraction (XRD) was used. Through the analysis of the XRD patterns, analysis was conducted of both the metal precipitate located in the bottom of the reaction vessel and if any silver metal or silver salts were being incorporated into the samples. The three major peaks observed in the precipitate correspond to the (111), (200), and (220) planes of metallic silver. The peaks present in the dry product correspond to Ag in several different states. The XRD pattern for the filtered and dried ICP indicates the presence of both silver salts and elemental silver. As the reaction proceeds for longer periods of time it appears that more silver is left in the polymer matrix.

Residual Metal Analysis As mentioned, there is a dramatic difference between the amount of silver and iron in the respective products. Only trace amounts of iron is left in the final polymer matrix (<0.01%), while there is about 1.8% silver in the samples when the reaction is carried out for 24 hours. Since silver has a favorable reduction potential, it is more likely to exist in the elemental state although some may remain as the soluble silver nitrate salt. Iron, however, will remain in the more stable Fe(II) state. During the washing process, any soluble metal salts remaining are washed away.

Conclusion The catalytic effects observed in this research have proven useful in the reduction of reaction times for the synthesis of Ligno-PANi when prepared in situ with certain second dopants. Results indicate that steric effects from the dopant influence the rate at which the anilinium radicals form. Silver nitrate and ferrous sulfate heptahydrate act as catalysts by functioning as Lewis acids and forming complexes with aniline. The complexation via the nitrogen lone pair reduces the steric hindrance around the amine. In the case of MSA-LP the effect of the iron cation is greater due to the smaller size compared to the silver cation. This was not observed for Ligno-PANi since complexation of the iron species by the lignosulfonate resulted in a reduced concentration of catalyst.

The invention is not limited to the above embodiments. The claims follow.

What is claimed is:

1. A method of making polyaniline grafted lignosulfonic acid, comprising the mixing of aniline and a lignosulfonate in the presence of a transition metal salt, wherein the transition metal of the salt is silver.

2. The method of claim 1, further comprising the step of mixing a sulfonic acid to dope the polyaniline grafted lignosulfonic acid, wherein the lignosulfonate is dissolved in the sulfonic acid.

3. The method of claim 2, wherein the sulfonic acid is methanesulfonic acid or p-toluenesulfonic acid.

4. The method of claim 1, wherein the lignosulfonate is sodium lignosulfonate.

5. A method of making polyaniline grafted lignosulfonic acid, comprising the mixing of aniline and a lignosulfonate in the presence of a transition metal salt, wherein the formation of metallic silver is a by-product.

6. The method of claim 1, further comprising addition of persulfate to lignosulfonate, aniline, and transition metal salt.

7. The method of claim 6, wherein the transition metal salt and the persulfate were in a molar ratio of 1:10.

* * * * *